United States Patent
Belverato

(10) Patent No.: US 11,683,735 B2
(45) Date of Patent: *Jun. 20, 2023

(54) DIVERSITY BLUETOOTH SYSTEM AND METHOD

(71) Applicant: BRAGI GmbH, Munich (DE)

(72) Inventor: Luigi Belverato, Munich (DE)

(73) Assignee: BRAGI GMBH, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/871,044

(22) Filed: Jul. 22, 2022

(65) Prior Publication Data
US 2022/0369188 A1    Nov. 17, 2022

Related U.S. Application Data

(63) Continuation of application No. 17/368,624, filed on Jul. 6, 2021, now Pat. No. 11,419,026, which is a
(Continued)

(51) Int. Cl.
*H04W 36/06* (2009.01)
*H04W 72/02* (2009.01)
(Continued)

(52) U.S. Cl.
CPC .......... *H04W 36/06* (2013.01); *H04B 5/0006* (2013.01); *H04R 1/1091* (2013.01);
(Continued)

(58) Field of Classification Search
CPC ....... H04W 36/06; H04W 4/80; H04W 72/02; H04B 5/0009; H04B 7/08; H04R 1/1091; H04R 5/033; H04R 2420/07
(Continued)

(56) References Cited

U.S. PATENT DOCUMENTS 2,325,590 A    8/1943    Carlisle et al.
2,430,229 A    11/1947   Kelsey
(Continued)

FOREIGN PATENT DOCUMENTS

CN    204244472 U    4/2015
CN    104683519 A    6/2015
(Continued)

OTHER PUBLICATIONS

Staab, Wayne J., et al., "A One-Size Disposable Hearing Aid is Introduced", The Hearing Journal 53(4):36-41) Apr. 2000.
(Continued)

*Primary Examiner* — Eugene Yun
(74) *Attorney, Agent, or Firm* — Goodhue, Coleman & Owens, P.C.

(57) ABSTRACT

A first device having a transceiver and an antenna operatively connected to the transceiver and a second device having a transceiver and an antenna operatively connected to the transceiver, the first device in operative communication with the first device through a communications linkage separate from the transceiver of the first device and the transceiver of the second device. The first device is adapted to wirelessly communicate with a remote device through the transceiver of the first device. The second device is adapted to wirelessly communicate with the remote device through the transceiver of the second device. The system is configured to evaluate the wireless connection between the first device and the remote device and to evaluate the wireless communication between the second device and the remote device and determine whether the first device or the second device has a better connection.

17 Claims, 3 Drawing Sheets

Related U.S. Application Data continuation of application No. 15/949,953, filed on Apr. 10, 2018, now Pat. No. 11,064,408, which is a continuation of application No. 15/290,811, filed on Oct. 11, 2016, now Pat. No. 9,980,189.

(60) Provisional application No. 62/244,167, filed on Oct. 20, 2015.

(51) Int. Cl.
    *H04W 4/80* (2018.01)
    *H04B 5/00* (2006.01)
    *H04R 5/033* (2006.01)
    *H04R 1/10* (2006.01)
    *H04B 7/08* (2006.01)

(52) U.S. Cl.
    CPC .............. *H04R 5/033* (2013.01); *H04W 4/80* (2018.02); *H04W 72/02* (2013.01); *H04B 7/08* (2013.01); *H04R 2420/07* (2013.01)

(58) Field of Classification Search
    USPC ........................................................ 455/41.2
    See application file for complete search history.

(56) References Cited

U.S. PATENT DOCUMENTS

| | | |
|---|---|---|
| 3,047,089 A | 7/1962 | Zwislocki |
| D208,784 S | 10/1967 | Sanzone |
| 3,586,794 A | 6/1971 | Michaelis |
| 3,696,377 A | 10/1972 | Wall |
| 3,934,100 A | 1/1976 | Harada |
| 3,983,336 A | 9/1976 | Malek et al. |
| 4,069,400 A | 1/1978 | Johanson et al. |
| 4,150,262 A | 4/1979 | Ono |
| 4,334,315 A | 6/1982 | Ono et al. |
| D266,271 S | 9/1982 | Johanson et al. |
| 4,375,016 A | 2/1983 | Harada |
| 4,588,867 A | 5/1986 | Konomi |
| 4,617,429 A | 10/1986 | Bellafiore |
| 4,654,883 A | 3/1987 | Iwata |
| 4,682,180 A | 7/1987 | Gans |
| 4,791,673 A | 12/1988 | Schreiber |
| 4,852,177 A | 7/1989 | Ambrose |
| 4,865,044 A | 9/1989 | Wallace et al. |
| 4,984,277 A | 1/1991 | Bisgaard et al. |
| 5,008,943 A | 4/1991 | Arndt et al. |
| 5,185,802 A | 2/1993 | Stanton |
| 5,191,602 A | 3/1993 | Regen et al. |
| 5,201,007 A | 4/1993 | Ward et al. |
| 5,201,008 A | 4/1993 | Arndt et al. |
| D340,286 S | 10/1993 | Seo |
| 5,280,524 A | 1/1994 | Norris |
| 5,295,193 A | 3/1994 | Ono |
| 5,298,692 A | 3/1994 | Ikeda et al. |
| 5,343,532 A | 8/1994 | Shugart |
| 5,347,584 A | 9/1994 | Narisawa |
| 5,363,444 A | 11/1994 | Norris |
| 5,444,786 A | 8/1995 | Raviv |
| D367,113 S | 2/1996 | Weeks |
| 5,497,339 A | 3/1996 | Bernard |
| 5,606,621 A | 2/1997 | Reiter et al. |
| 5,613,222 A | 3/1997 | Guenther |
| 5,654,530 A | 8/1997 | Sauer et al. |
| 5,692,059 A | 11/1997 | Kruger |
| 5,721,783 A | 2/1998 | Anderson |
| 5,748,743 A | 5/1998 | Weeks |
| 5,749,072 A | 5/1998 | Mazurkiewicz et al. |
| 5,771,438 A | 6/1998 | Palermo et al. |
| D397,796 S | 9/1998 | Yabe et al. |
| 5,802,167 A | 9/1998 | Hong |
| 5,844,996 A | 12/1998 | Enzmann et al. |
| D410,008 S | 5/1999 | Almqvist |
| 5,929,774 A | 7/1999 | Charlton |
| 5,933,506 A | 8/1999 | Aoki et al. |
| 5,949,896 A | 9/1999 | Nageno et al. |
| 5,987,146 A | 11/1999 | Pluvinage et al. |
| 6,021,207 A | 2/2000 | Puthuff et al. |
| 6,054,989 A | 4/2000 | Robertson et al. |
| 6,081,724 A | 6/2000 | Wilson |
| 6,084,526 A | 7/2000 | Blotky et al. |
| 6,094,492 A | 7/2000 | Boesen |
| 6,111,569 A | 8/2000 | Brusky et al. |
| 6,112,103 A | 8/2000 | Puthuff |
| 6,157,727 A | 12/2000 | Rueda |
| 6,167,039 A | 12/2000 | Karlsson et al. |
| 6,181,801 B1 | 1/2001 | Puthuff et al. |
| 6,185,152 B1 | 2/2001 | Shen |
| 6,208,372 B1 | 3/2001 | Barraclough |
| 6,230,029 B1 | 5/2001 | Yegiazaryan et al. |
| 6,275,789 B1 | 8/2001 | Moser et al. |
| 6,339,754 B1 | 1/2002 | Flanagan et al. |
| D455,835 S | 4/2002 | Anderson et al. |
| 6,408,081 B1 | 6/2002 | Boesen |
| 6,424,820 B1 | 7/2002 | Burdick et al. |
| D464,039 S | 10/2002 | Boesen |
| 6,470,893 B1 | 10/2002 | Boesen |
| D468,299 S | 1/2003 | Boesen |
| D468,300 S | 1/2003 | Boesen |
| 6,542,721 B2 | 4/2003 | Boesen |
| 6,560,468 B1 | 5/2003 | Boesen |
| 6,563,301 B2 | 5/2003 | Gventer |
| 6,654,721 B2 | 11/2003 | Handelman |
| 6,664,713 B2 | 12/2003 | Boesen |
| 6,690,807 B1 | 2/2004 | Meyer |
| 6,694,180 B1 | 2/2004 | Boesen |
| 6,718,043 B1 | 4/2004 | Boesen |
| 6,738,485 B1 | 5/2004 | Boesen |
| 6,748,095 B1 | 6/2004 | Goss |
| 6,754,358 B1 | 6/2004 | Boesen et al. |
| 6,784,873 B1 | 8/2004 | Boesen et al. |
| 6,823,195 B1 | 11/2004 | Boesen |
| 6,852,084 B1 | 2/2005 | Boesen |
| 6,879,698 B2 | 4/2005 | Boesen |
| 6,892,082 B2 | 5/2005 | Boesen |
| 6,920,229 B2 | 7/2005 | Boesen |
| 6,952,483 B2 | 10/2005 | Boesen et al. |
| 6,987,986 B2 | 1/2006 | Boesen |
| 7,010,137 B1 | 3/2006 | Leedom et al. |
| 7,113,611 B2 | 9/2006 | Leedom et al. |
| D532,520 S | 11/2006 | Kampmeier et al. |
| 7,136,282 B1 | 11/2006 | Rebeske |
| 7,203,331 B2 | 4/2007 | Boesen |
| 7,209,569 B2 | 4/2007 | Boesen |
| 7,215,790 B2 | 5/2007 | Boesen et al. |
| D549,222 S | 8/2007 | Huang |
| D554,756 S | 11/2007 | Sjursen et al. |
| 7,403,629 B1 | 7/2008 | Aceti et al. |
| D579,006 S | 10/2008 | Kim et al. |
| 7,463,902 B2 | 12/2008 | Boesen |
| 7,508,411 B2 | 3/2009 | Boesen |
| 7,532,901 B1 | 5/2009 | LaFranchise et al. |
| D601,134 S | 9/2009 | Elabidi et al. |
| 7,825,626 B2 | 11/2010 | Kozisek |
| 7,859,469 B1 | 12/2010 | Rosener et al. |
| 7,965,855 B1 | 6/2011 | Ham |
| 7,979,035 B2 | 7/2011 | Griffin et al. |
| 7,983,628 B2 | 7/2011 | Boesen |
| D647,491 S | 10/2011 | Chen et al. |
| 8,095,188 B2 | 1/2012 | Shi |
| 8,108,143 B1 | 1/2012 | Tester |
| 8,140,357 B1 | 3/2012 | Boesen |
| D666,581 S | 9/2012 | Perez |
| 8,300,864 B2 | 10/2012 | Müllenborn et al. |
| 8,406,448 B2 | 3/2013 | Lin et al. |
| 8,430,817 B1 | 4/2013 | Al-Ali et al. |
| 8,436,780 B2 | 5/2013 | Schantz et al. |
| D687,021 S | 7/2013 | Yuen |
| 8,679,012 B1 | 3/2014 | Kayyali |
| 8,719,877 B2 | 5/2014 | VonDoenhoff et al. |
| 8,774,434 B2 | 7/2014 | Zhao et al. |
| 8,831,266 B1 | 9/2014 | Huang |
| 8,891,800 B1 | 11/2014 | Shaffer |

(56) References Cited

U.S. PATENT DOCUMENTS

| | | |
|---|---|---|
| 8,994,498 B2 | 3/2015 | Agrafioti et al. |
| D728,107 S | 4/2015 | Martin et al. |
| 9,013,145 B2 | 4/2015 | Castillo et al. |
| 9,037,125 B1 | 5/2015 | Kadous |
| D733,103 S | 6/2015 | Jeong et al. |
| 9,081,944 B2 | 7/2015 | Camacho et al. |
| 9,461,403 B2 | 10/2016 | Gao et al. |
| 9,510,159 B1 | 11/2016 | Cuddihy et al. |
| D773,439 S | 12/2016 | Walker |
| D775,158 S | 12/2016 | Dong et al. |
| D777,710 S | 1/2017 | Palmborg et al. |
| 9,544,689 B2 | 1/2017 | Fisher et al. |
| D788,079 S | 5/2017 | Son et al. |
| 9,684,778 B2 | 6/2017 | Tharappel et al. |
| 9,711,062 B2 | 7/2017 | Ellis et al. |
| 9,729,979 B2 | 8/2017 | Özden |
| 9,767,709 B2 | 9/2017 | Ellis |
| 9,848,257 B2 | 12/2017 | Ambrose et al. |
| 10,306,380 B2 | 5/2019 | Roeck et al. |
| 11,064,408 B2 * | 7/2021 | Belverato ............ H04B 5/0006 |
| 2001/0005197 A1 | 6/2001 | Mishra et al. |
| 2001/0027121 A1 | 10/2001 | Boesen |
| 2001/0043707 A1 | 11/2001 | Leedom |
| 2001/0056350 A1 | 12/2001 | Calderone et al. |
| 2002/0002413 A1 | 1/2002 | Tokue |
| 2002/0007510 A1 | 1/2002 | Mann |
| 2002/0010590 A1 | 1/2002 | Lee |
| 2002/0030637 A1 | 3/2002 | Mann |
| 2002/0046035 A1 | 4/2002 | Kitahara et al. |
| 2002/0057810 A1 | 5/2002 | Boesen |
| 2002/0076073 A1 | 6/2002 | Taenzer et al. |
| 2002/0118852 A1 | 8/2002 | Boesen |
| 2003/0002705 A1 | 1/2003 | Boesen |
| 2003/0065504 A1 | 4/2003 | Kraemer et al. |
| 2003/0100331 A1 | 5/2003 | Dress et al. |
| 2003/0104806 A1 | 6/2003 | Ruef et al. |
| 2003/0115068 A1 | 6/2003 | Boesen |
| 2003/0125096 A1 | 7/2003 | Boesen |
| 2003/0218064 A1 | 11/2003 | Conner et al. |
| 2004/0070564 A1 | 4/2004 | Dawson et al. |
| 2004/0102931 A1 | 5/2004 | Ellis et al. |
| 2004/0160511 A1 | 8/2004 | Boesen |
| 2005/0017842 A1 | 1/2005 | Dematteo |
| 2005/0043056 A1 | 2/2005 | Boesen |
| 2005/0094839 A1 | 5/2005 | Gwee |
| 2005/0125320 A1 | 6/2005 | Boesen |
| 2005/0148883 A1 | 7/2005 | Boesen |
| 2005/0165663 A1 | 7/2005 | Razumov |
| 2005/0196009 A1 | 9/2005 | Boesen |
| 2005/0197063 A1 | 9/2005 | White |
| 2005/0212911 A1 | 9/2005 | Marvit et al. |
| 2005/0251455 A1 | 11/2005 | Boesen |
| 2005/0266876 A1 | 12/2005 | Boesen |
| 2006/0029246 A1 | 2/2006 | Boesen |
| 2006/0073787 A1 | 4/2006 | Lair et al. |
| 2006/0074671 A1 | 4/2006 | Farmaner et al. |
| 2006/0074808 A1 | 4/2006 | Boesen |
| 2006/0166715 A1 | 7/2006 | Engelen et al. |
| 2006/0166716 A1 | 7/2006 | Seshadri et al. |
| 2006/0220915 A1 | 10/2006 | Bauer |
| 2006/0251277 A1 | 11/2006 | Cho |
| 2006/0258412 A1 | 11/2006 | Liu |
| 2007/0102009 A1 | 5/2007 | Wong et al. |
| 2007/0147629 A1 | 6/2007 | Chiloyan |
| 2007/0149261 A1 | 6/2007 | Huddart |
| 2007/0239225 A1 | 10/2007 | Saringer |
| 2007/0269785 A1 | 11/2007 | Yamanoi |
| 2008/0076489 A1 | 3/2008 | Rosener et al. |
| 2008/0076972 A1 | 3/2008 | Dorogusker et al. |
| 2008/0090622 A1 | 4/2008 | Kim et al. |
| 2008/0101279 A1 | 5/2008 | Russell et al. |
| 2008/0102424 A1 | 5/2008 | Holljes |
| 2008/0146890 A1 | 6/2008 | LeBoeuf et al. |
| 2008/0187163 A1 | 8/2008 | Goldstein et al. |
| 2008/0215239 A1 | 9/2008 | Lee |
| 2008/0253583 A1 | 10/2008 | Goldstein |
| 2008/0254780 A1 | 10/2008 | Kuhl et al. |
| 2008/0255430 A1 | 10/2008 | Alexandersson et al. |
| 2008/0298606 A1 | 12/2008 | Johnson et al. |
| 2009/0003620 A1 | 1/2009 | McKillop et al. |
| 2009/0008275 A1 | 1/2009 | Ferrari et al. |
| 2009/0017881 A1 | 1/2009 | Madrigal |
| 2009/0041313 A1 | 2/2009 | Brown |
| 2009/0073070 A1 | 3/2009 | Rofougaran |
| 2009/0097689 A1 | 4/2009 | Prest et al. |
| 2009/0105548 A1 | 4/2009 | Bart |
| 2009/0154739 A1 | 6/2009 | Zellner |
| 2009/0191920 A1 | 7/2009 | Regen et al. |
| 2009/0197532 A1 | 8/2009 | Wyper |
| 2009/0226017 A1 | 9/2009 | Abolfathi et al. |
| 2009/0240947 A1 | 9/2009 | Goyal et al. |
| 2009/0245559 A1 | 10/2009 | Boltyenkov et al. |
| 2009/0261114 A1 | 10/2009 | McGuire et al. |
| 2009/0296968 A1 | 12/2009 | Wu et al. |
| 2009/0303073 A1 | 12/2009 | Gilling et al. |
| 2009/0304210 A1 | 12/2009 | Weisman |
| 2010/0033313 A1 | 2/2010 | Keady et al. |
| 2010/0075631 A1 | 3/2010 | Black et al. |
| 2010/0128907 A1 | 5/2010 | Dijkstra et al. |
| 2010/0166206 A1 | 7/2010 | Macours |
| 2010/0203831 A1 | 8/2010 | Muth |
| 2010/0210212 A1 | 8/2010 | Sato |
| 2010/0290636 A1 | 11/2010 | Mao et al. |
| 2010/0320961 A1 | 12/2010 | Castillo et al. |
| 2011/0018731 A1 | 1/2011 | Linsky et al. |
| 2011/0103609 A1 | 5/2011 | Pelland et al. |
| 2011/0137141 A1 | 6/2011 | Razoumov et al. |
| 2011/0140844 A1 | 6/2011 | McGuire et al. |
| 2011/0239497 A1 | 10/2011 | McGuire et al. |
| 2011/0286615 A1 | 11/2011 | Olodort et al. |
| 2011/0293105 A1 | 12/2011 | Arie et al. |
| 2012/0057740 A1 | 3/2012 | Rosal |
| 2012/0155670 A1 | 6/2012 | Rutschman |
| 2012/0159617 A1 | 6/2012 | Wu et al. |
| 2012/0163626 A1 | 6/2012 | Booij et al. |
| 2012/0197737 A1 | 8/2012 | LeBoeuf et al. |
| 2012/0231732 A1 | 9/2012 | Kerselaers |
| 2012/0235883 A1 | 9/2012 | Border et al. |
| 2012/0309453 A1 | 12/2012 | Maguire |
| 2013/0106454 A1 | 5/2013 | Liu et al. |
| 2013/0154826 A1 | 6/2013 | Ratajczyk |
| 2013/0178967 A1 | 7/2013 | Mentz |
| 2013/0200999 A1 | 8/2013 | Spodak et al. |
| 2013/0204617 A1 | 8/2013 | Kuo et al. |
| 2013/0293494 A1 | 11/2013 | Reshef |
| 2013/0316642 A1 | 11/2013 | Newham |
| 2013/0346168 A1 | 12/2013 | Zhou et al. |
| 2014/0004912 A1 | 1/2014 | Rajakarunanayake |
| 2014/0014697 A1 | 1/2014 | Schmierer et al. |
| 2014/0020089 A1 | 1/2014 | Perini, II |
| 2014/0072136 A1 | 3/2014 | Tenenbaum et al. |
| 2014/0072146 A1 | 3/2014 | Itkin et al. |
| 2014/0073429 A1 | 3/2014 | Meneses et al. |
| 2014/0079257 A1 | 3/2014 | Ruwe et al. |
| 2014/0106677 A1 | 4/2014 | Altman |
| 2014/0122116 A1 | 5/2014 | Smythe |
| 2014/0146973 A1 | 5/2014 | Liu et al. |
| 2014/0153768 A1 | 6/2014 | Hagen et al. |
| 2014/0163771 A1 | 6/2014 | Demeniuk |
| 2014/0185828 A1 | 7/2014 | Helbling |
| 2014/0219467 A1 | 8/2014 | Kurtz |
| 2014/0222462 A1 | 8/2014 | Shakil et al. |
| 2014/0235169 A1 | 8/2014 | Parkinson et al. |
| 2014/0270227 A1 | 9/2014 | Swanson |
| 2014/0270271 A1 | 9/2014 | Dehe et al. |
| 2014/0276227 A1 | 9/2014 | Pérez |
| 2014/0294193 A1 | 10/2014 | Tikander et al. |
| 2014/0310595 A1 | 10/2014 | Acharya et al. |
| 2014/0321682 A1 | 10/2014 | Kofod-Hansen et al. |
| 2014/0335908 A1 | 11/2014 | Krisch |
| 2014/0348367 A1 | 11/2014 | Vavrus et al. |
| 2015/0028996 A1 | 1/2015 | Agrafioti et al. |
| 2015/0035643 A1 | 2/2015 | Kursun |
| 2015/0036835 A1 | 2/2015 | Chen |

(56) References Cited

U.S. PATENT DOCUMENTS

| | | |
|---|---|---|
| 2015/0056584 A1 | 2/2015 | Boulware et al. |
| 2015/0110587 A1 | 4/2015 | Hori |
| 2015/0148989 A1 | 5/2015 | Cooper et al. |
| 2015/0181356 A1 | 6/2015 | Krystek et al. |
| 2015/0195857 A1 | 7/2015 | Pan et al. |
| 2015/0230022 A1 | 8/2015 | Sakai et al. |
| 2015/0245127 A1 | 8/2015 | Shaffer |
| 2015/0256949 A1 | 9/2015 | Vanpoucke et al. |
| 2015/0264472 A1 | 9/2015 | Aase |
| 2015/0264501 A1 | 9/2015 | Hu et al. |
| 2015/0317565 A1 | 11/2015 | Li et al. |
| 2015/0358751 A1 | 12/2015 | Deng et al. |
| 2015/0359436 A1 | 12/2015 | Shim et al. |
| 2015/0364058 A1 | 12/2015 | Lagree |
| 2015/0373467 A1 | 12/2015 | Gelter |
| 2015/0373474 A1 | 12/2015 | Kraft et al. |
| 2015/0379251 A1 | 12/2015 | Komaki |
| 2016/0033280 A1 | 2/2016 | Moore et al. |
| 2016/0034249 A1 | 2/2016 | Lee et al. |
| 2016/0071526 A1 | 3/2016 | Wingate et al. |
| 2016/0072558 A1 | 3/2016 | Hirsch et al. |
| 2016/0073189 A1 | 3/2016 | Lindén et al. |
| 2016/0094550 A1 | 3/2016 | Bradley et al. |
| 2016/0100262 A1 | 4/2016 | Inagaki |
| 2016/0119737 A1 | 4/2016 | Mehnert et al. |
| 2016/0124707 A1 | 5/2016 | Ermilov et al. |
| 2016/0125892 A1 | 5/2016 | Bowen et al. |
| 2016/0140870 A1 | 5/2016 | Connor |
| 2016/0142818 A1 | 5/2016 | Park |
| 2016/0162259 A1 | 6/2016 | Zhao et al. |
| 2016/0209691 A1 | 7/2016 | Yang et al. |
| 2016/0219358 A1 | 7/2016 | Shaffer |
| 2016/0253994 A1 | 9/2016 | Panchapagesan et al. |
| 2016/0324478 A1 | 11/2016 | Goldstein |
| 2016/0330541 A1 | 11/2016 | Miao |
| 2016/0353196 A1 | 12/2016 | Baker et al. |
| 2016/0360350 A1 | 12/2016 | Watson et al. |
| 2017/0021257 A1 | 1/2017 | Gilbert |
| 2017/0046503 A1 | 2/2017 | Cho et al. |
| 2017/0059152 A1 | 3/2017 | Hirsch et al. |
| 2017/0060262 A1 | 3/2017 | Hviid et al. |
| 2017/0060269 A1 | 3/2017 | Förstner et al. |
| 2017/0061751 A1 | 3/2017 | Loermann et al. |
| 2017/0061817 A1 | 3/2017 | May |
| 2017/0062913 A1 | 3/2017 | Hirsch et al. |
| 2017/0064426 A1 | 3/2017 | Hviid |
| 2017/0064428 A1 | 3/2017 | Hirsch |
| 2017/0064432 A1 | 3/2017 | Hviid et al. |
| 2017/0064437 A1 | 3/2017 | Hviid et al. |
| 2017/0078780 A1 | 3/2017 | Qian et al. |
| 2017/0078785 A1 | 3/2017 | Qian et al. |
| 2017/0100277 A1 | 4/2017 | Ke |
| 2017/0108918 A1 | 4/2017 | Boesen |
| 2017/0109131 A1 | 4/2017 | Boesen |
| 2017/0110124 A1 | 4/2017 | Boesen et al. |
| 2017/0110899 A1 | 4/2017 | Boesen |
| 2017/0111723 A1 | 4/2017 | Boesen |
| 2017/0111725 A1 | 4/2017 | Boesen et al. |
| 2017/0111726 A1 | 4/2017 | Martin et al. |
| 2017/0111740 A1 | 4/2017 | Hviid et al. |
| 2017/0127168 A1 | 5/2017 | Briggs et al. |
| 2017/0131094 A1 | 5/2017 | Kulik |
| 2017/0142511 A1 | 5/2017 | Dennis |
| 2017/0146801 A1 | 5/2017 | Stempora |
| 2017/0150920 A1 | 6/2017 | Chang et al. |
| 2017/0151085 A1 | 6/2017 | Chang et al. |
| 2017/0151447 A1 | 6/2017 | Boesen |
| 2017/0151668 A1 | 6/2017 | Boesen |
| 2017/0151918 A1 | 6/2017 | Boesen |
| 2017/0151930 A1 | 6/2017 | Boesen |
| 2017/0151957 A1 | 6/2017 | Boesen |
| 2017/0151959 A1 | 6/2017 | Boesen |
| 2017/0153114 A1 | 6/2017 | Boesen |
| 2017/0153636 A1 | 6/2017 | Boesen |
| 2017/0154532 A1 | 6/2017 | Boesen |
| 2017/0155985 A1 | 6/2017 | Boesen |
| 2017/0155992 A1 | 6/2017 | Perianu et al. |
| 2017/0155993 A1 | 6/2017 | Boesen |
| 2017/0155997 A1 | 6/2017 | Boesen |
| 2017/0155998 A1 | 6/2017 | Boesen |
| 2017/0156000 A1 | 6/2017 | Boesen |
| 2017/0164890 A1 | 6/2017 | Leip et al. |
| 2017/0178631 A1 | 6/2017 | Boesen |
| 2017/0180842 A1 | 6/2017 | Boesen |
| 2017/0180843 A1 | 6/2017 | Perianu et al. |
| 2017/0180897 A1 | 6/2017 | Perianu |
| 2017/0188127 A1 | 6/2017 | Perianu et al. |
| 2017/0188132 A1 | 6/2017 | Hirsch et al. |
| 2017/0193978 A1 | 7/2017 | Goldman |
| 2017/0195829 A1 | 7/2017 | Belverato et al. |
| 2017/0208393 A1 | 7/2017 | Boesen |
| 2017/0214987 A1 | 7/2017 | Boesen |
| 2017/0215016 A1 | 7/2017 | Dohmen et al. |
| 2017/0230752 A1 | 8/2017 | Dohmen et al. |
| 2017/0238103 A1 | 8/2017 | Gehring et al. |
| 2017/0251933 A1 | 9/2017 | Braun et al. |
| 2017/0257698 A1 | 9/2017 | Boesen et al. |
| 2017/0258329 A1 | 9/2017 | Marsh |
| 2017/0263236 A1 | 9/2017 | Boesen et al. |
| 2017/0263376 A1 | 9/2017 | Verschueren et al. |
| 2017/0266494 A1 | 9/2017 | Crankson et al. |
| 2017/0273622 A1 | 9/2017 | Boesen |
| 2017/0280257 A1 | 9/2017 | Gordon et al. |
| 2017/0301337 A1 | 10/2017 | Golani et al. |
| 2017/0361213 A1 | 12/2017 | Goslin et al. |
| 2017/0366233 A1 | 12/2017 | Hviid et al. |
| 2018/0007994 A1 | 1/2018 | Boesen et al. |
| 2018/0008194 A1 | 1/2018 | Boesen |
| 2018/0008198 A1 | 1/2018 | Kingscott |
| 2018/0009447 A1 | 1/2018 | Boesen et al. |
| 2018/0011006 A1 | 1/2018 | Kingscott |
| 2018/0011682 A1 | 1/2018 | Milevski et al. |
| 2018/0011994 A1 | 1/2018 | Boesen |
| 2018/0012228 A1 | 1/2018 | Milevski et al. |
| 2018/0013195 A1 | 1/2018 | Hviid et al. |
| 2018/0014102 A1 | 1/2018 | Hirsch et al. |
| 2018/0014103 A1 | 1/2018 | Martin et al. |
| 2018/0014104 A1 | 1/2018 | Boesen et al. |
| 2018/0014107 A1 | 1/2018 | Razouane et al. |
| 2018/0014108 A1 | 1/2018 | Dragicevic et al. |
| 2018/0014109 A1 | 1/2018 | Boesen |
| 2018/0014113 A1 | 1/2018 | Boesen |
| 2018/0014140 A1 | 1/2018 | Milevski et al. |
| 2018/0014436 A1 | 1/2018 | Milevski |
| 2018/0034951 A1 | 2/2018 | Boesen |
| 2018/0040093 A1 | 2/2018 | Boesen |
| 2018/0042501 A1 | 2/2018 | Adi et al. |
| 2018/0234777 A1 | 8/2018 | Roeck et al. |

FOREIGN PATENT DOCUMENTS

| | | |
|---|---|---|
| CN | 104837094 A | 8/2015 |
| EP | 1469659 A1 | 10/2004 |
| EP | 1017252 A3 | 5/2006 |
| EP | 2871857 A1 | 5/2015 |
| EP | 2903186 A1 | 8/2015 |
| GB | 2074817 | 11/1981 |
| GB | 2508226 A | 5/2014 |
| JP | 06292195 | 10/1998 |
| WO | 2008103925 A1 | 8/2008 |
| WO | 2008113053 A1 | 9/2008 |
| WO | 2007034371 A3 | 11/2008 |
| WO | 2011001433 A2 | 1/2011 |
| WO | 2012071127 A1 | 5/2012 |
| WO | 2013134956 A1 | 9/2013 |
| WO | 2014046602 A1 | 3/2014 |
| WO | 2014043179 A3 | 7/2014 |
| WO | 2015061633 A2 | 4/2015 |
| WO | 2015110577 A1 | 7/2015 |
| WO | 2015110587 A1 | 7/2015 |

(56) References Cited

FOREIGN PATENT DOCUMENTS

| WO | 2016032990 A1 | 3/2016 |
|---|---|---|
| WO | 2016187869 A1 | 12/2016 |

OTHER PUBLICATIONS

Stretchgoal—It's Your Dash (Feb. 14, 2014), pp. 1-14.
Stretchgoal—The Carrying Case for The Dash (Feb. 12, 2014), pp. 1-9.
Stretchgoal—Windows Phone Support (Feb. 17, 2014), pp. 1-17.
The Dash + The Charging Case & The BRAGI News (Feb. 21, 2014), pp. 1-12.
The Dash—A Word From Our Software, Mechanical and Acoustics Team + An Update (Mar. 11, 2014), pp. 1-7.
Update From BRAGI—$3,000,000—Yipee (Mar. 22, 2014), pp. 1-11.
Weisiger; "Conjugated Hyperbilirubinemia", Jan. 5, 2016.
Wertzner et al., "Analysis of fundamental frequency, jitter, shimmer and vocal intensity in children with phonological disorders", V. 71, n.5, 582-588, Sep./Oct. 2005; Brazilian Journal of Othrhinolaryngology.
Wikipedia, "Gamebook", https://en.wikipedia.org/wiki/Gamebook, Sep. 3, 2017, 5 pages.
Wikipedia, "Kinect", "https://en.wikipedia.org/wiki/Kinect", 18 pages, (Sep. 9, 2017).
Wikipedia, "Wii Balance Board", "https://en.wikipedia.org/wiki/Wii_Balance_Board", 3 pages, (Jul. 20, 2017).
"Office Action pursuant to Art. 94(3) EPC", European Patent No. 16 794 531.0-1220, European Patent Office, 5 pages, dated May 29, 2019.
Akkermans, "Acoustic Ear Recognition for Person Identification", Automatic Identification Advanced Technologies, 2005 pp. 219-223.
Alzahrani et al: "A Multi-Channel Opto-Electronic Sensor to Accurately Monitor Heart Rate against Motion Artefact during Exercise", Sensors, vol. 15, No. 10, Oct. 12, 2015, pp. 25681-25702, XPO55334602, DOI: 10.3390/s151025681 the whole document.
Announcing the $3,333,333 Stretch Goal (Feb. 24, 2014) pp. 1-14.
Ben Coxworth: "Graphene-based ink could enable low-cost, foldable electronics", "Journal of Physical Chemistry Letters", Northwestern University, (May 22, 2013), pp. 1-7.
Blain: "World's first graphene speaker already superior to Sennheiser MX400", htt://www.gizmag.com/graphene-speaker-beats-sennheiser-mx400/31660, (Apr. 15, 2014).
BMW, "BMW introduces BMW Connected—The personalized digital assistant", "http://bmwblog.com/2016/01/05/bmw-introduces-bmw-connected-the-personalized-digital-assistant", (Jan. 5, 2016).
Bragi Update—Arrival Of Prototype Chassis Parts—More People—Awesomeness (May 13, 2014), pp. 1-8.
Bragi Update—Chinese New Year, Design Verification, Charging Case, More People, Timeline(Mar. 6, 2015), pp. 1-18.
Bragi Update—First Sleeves From Prototype Tool—Software Development Kit (Jun. 5, 2014), pp. 1-8.
Bragi Update—Let's Get Ready To Rumble, A Lot To Be Done Over Christmas (Dec. 22, 2014), pp. 1-18.
Bragi Update—Memories From April—Update On Progress (Sep. 16, 2014), pp. 1-15.
Bragi Update—Memories from May—Update On Progress—Sweet (Oct. 13, 2014), pp. 1-16.
Bragi Update—Memories From One Month Before Kickstarter—Update On Progress (Jul. 10, 2014), pp. 1-17.
Bragi Update—Memories From The First Month of Kickstarter—Update on Progress (Aug. 1, 2014), pp. 1-16.
Bragi Update—Memories From The Second Month of Kickstarter—Update On Progress (Aug. 22, 2014), pp. 1-15.
Bragi Update—New People @BRAGI—Prototypes (Jun. 26, 2014), pp. 1-9.
Bragi Update—Office Tour, Tour To China, Tour to CES (Dec. 11, 2014), pp. 1-14.
Bragi Update—Status On Wireless, Bits and Pieces, Testing—Oh Yeah, Timeline(Apr. 24, 2015), pp. 1-18.
Bragi Update—The App Preview, The Charger, The SDK, BRAGI Funding and Chinese New Year (Feb. 11, 2015), pp. 1-19.
Bragi Update—What We Did Over Christmas, Las Vegas & CES (Jan. 19, 2014), pp. 1-21.
Bragi Update—Years of Development, Moments of Utter Joy and Finishing What We Started(Jun. 5, 2015), pp. 1-21.
Bragi Update—Alpha 5 and Back To China, Backer Day, On Track(May 16, 2015), pp. 1-15.
Bragi Update—Beta2 Production and Factory Line(Aug. 20, 2015), pp. 1-16.
Bragi Update—Certifications, Production, Ramping Up (Nov. 13, 2015), pp. 1-15.
Bragi Update—Developer Units Shipping and Status(Oct. 5, 2015), pp. 1-20.
Bragi Update—Developer Units Started Shipping and Status (Oct. 19, 2015), pp. 1-20.
Bragi Update—Developer Units, Investment, Story and Status(Nov. 2, 2015), pp. 1-14.
Bragi Update—Getting Close(Aug. 6, 2015), pp. 1-20.
Bragi Update—On Track, Design Verification, How It Works and What's Next(Jul. 15, 2015), pp. 1-17.
Bragi Update—On Track, On Track and Gems Overview (Jun. 24, 2015), pp. 1-19.
Bragi Update—Status On Wireless, Supply, Timeline and Open House@BRAGI(Apr. 1, 2015), pp. 1-17.
Bragi Update—Unpacking Video, Reviews On Audio Perform and Boy Are We Getting Close(Sep. 10, 2015), pp. 1-15.
Healthcare Risk Management Review, "Nuance updates computer-assisted physician documentation solution" (Oct. 20, 2016), pp. 1-2.
Hoffman, "How to Use Android Beam to Wirelessly Transfer Content Between Devices", (Feb. 22, 2013).
International Preliminary Reporton Patentability, PCT/EP2016/075130, dated May 3, 2018, 7 Pages.
International Search Report & Written Opinion, PCT/EP2016/070216 (dated Oct. 18, 2016) 13 pages.
International Search Report & Written Opinion, PCT/EP2016/070231 (dated Nov. 18, 2016) 12 pages.
International Search Report & Written Opinion, PCT/EP2016/070245 (dated Nov. 16, 2016) 10 pages.
International Search Report & Written Opinion, PCT/EP2016/070247 (dated Nov. 18, 2016) 13 pages.
International Search Report and Written Opinion, PCT/EP2016/070228 (dated Jan. 9, 2017) 13 pages.
Jain A et al: "Score normalization in multimodal biometric systems", Pattern Recognition, Elsevier, GB, vol. 38, No. 12, Dec. 31, 2005, pp. 2270-2285, XP027610849, ISSN: 0031-3203.
Last Push Before The Kickstarter Campaign Ends on Monday 4pm CET (Mar. 28, 2014), pp. 1-7.
Lovejoy: "Touch ID built into iPhone display one step closer as third-party company announces new tech", "http://9to5mac.com/2015/07/21/virtualhomebutton/" (Jul. 21, 2015).
Nemanja Paunovic et al, "A methodology for testing complex professional electronic systems", Serbian Journal of Electrical Engineering, vol. 9, No. 1, Feb. 1, 2012, pp. 71-80, XPO55317584, Yu.
Nigel Whitfield: "Fake tape detectors, from the stands' footie and UGH? Internet of Things in my set-top box"; http://www.theregister.co.uk/2014/09/24/ibc_round_up_object_audio_dlna_iot/ (Sep. 24, 2014).
Nuance, "ING Netherlands Launches Voice Biometrics Payment System in the Mobile Banking App Powered by Nuance", "https://www.nuance.com/about-us/newsroom/press-releases/ing-netherlands-launches-nuance-voice-biometrics.html", 4 pages (Jul. 28, 2015).

* cited by examiner

DIVERSITY BLUETOOTH SYSTEM AND METHOD

PRIORITY STATEMENT

This application is a continuation of U.S. patent application Ser. No. 17/368,624, filed on Jul. 6, 2021 which is a continuation of U.S. patent application Ser. No. 15/949,953, filed on Apr. 10, 2018 and now U.S. Pat. No. 11,064,408 which is a continuation of U.S. patent application Ser. No. 15/290,811, filed on Oct. 11, 2016 and now U.S. Pat. No. 9,980,189 which claims priority to U.S. Provisional Patent Application No. 62/244,167 filed on Oct. 20, 2015, all titled Diversity Bluetooth System and Method, all of which are hereby incorporated by reference in their entireties.

FIELD OF THE INVENTION

The present invention relates to wearable devices. More particularly, but not exclusively, the present invention relates to ear pieces, wireless headphones and other devices.

BACKGROUND

Issues with the transmission and reception of Bluetooth signals remain challenging in many situations. Common areas of difficulty involve systems requiring proximity of the communicating entities. There are numerous reasons for such difficulties. Variables such as materials which are impervious to penetration by radio waves at the frequencies used by Bluetooth technology continue to remain problematic. One example of such difficulty involves the use of wireless Bluetooth earpieces.

Depending on the location of the source and the location of the antenna of the earpiece or headphone, a reliable and stable connection might be difficult or impossible, since the body itself of the person wearing the headphones acts as a shield. This is especially notable if the antenna is located on one side of the head, and the source is carried on the opposite side, for example in a trouser, or even a shirt pocket.

Outdoors the connection is made even more difficult due to lack of radio reflecting surfaces (ceiling, close vertical walls, solid floor), so a close to line of sight connection between the communication actors may be needed. What is needed are new systems and methods to address these issues.

SUMMARY

Therefore, it is a primary object, feature, or advantage of the present invention to improve over the state of the art.

It is a further object, feature, or advantage of the present invention to improve wireless connections in devices such as wearable devices such as ear pieces and head phones which connect wirelessly to other devices.

It is a still further object, feature, or advantage of the present invention to provide for methods and systems maintaining connections even in significantly adverse environments.

Another object, feature, or advantage is to provide for methods and systems suitable to use for audio streaming.

Yet another object, feature, or advantage is to provide for lowering power utilization by creating optimal linkages.

A further object, feature, or advantage is to provide for addressing problems of weak transmissions at an underserved area.

A still further object, feature, or advantage is to provide a solution which allows devices to remain within Bluetooth standards while simultaneously delivering the required connection in the defined adverse environments.

One or more of these and/or other objects, features, or advantages of the present invention will become apparent from the specification and claims following. No single embodiment need provide every object, feature, or advantage. Different embodiments may have different objects, features, or advantages. Therefore, the present invention is not to be limited to or by any objects, features, or advantages stated herein.

According to one aspect a system includes a first device having a transceiver and an antenna operatively connected to the transceiver and a second device having a transceiver and an antenna operatively connected to the transceiver, the first device in operative communication with the first device through a communications linkage separate from the transceiver of the first device and the transceiver of the second device. The first device is adapted to wirelessly communicate with a remote device through the transceiver of the first device. The second device is adapted to wirelessly communicate with the remote device through the transceiver of the second device. The system is configured to evaluate the wireless connection between the first device and the remote device and to evaluate the wireless communication between the second device and the remote device and determine whether the first device or the second device has a better connection and if the first device has the better connection to use the wireless connection between the first device and the remote device and if the second device has the better connection to use the wireless connection between the second device and the remote device. The first device may be a left ear piece and the second device may be a right ear piece. The first device may be a left portion of a headphone set and the second device may be a right portion of the headphone system. The better connection may provide a stronger signal. The transceiver of the first device may be a Bluetooth transceiver and the transceiver of the second device may be a Bluetooth transceiver. The first device may be configured to receive streaming audio of the wireless connection between the first device and the remote device and the second device may be configured to receiving streaming audio of the wireless connection between the second device and the remote device. The communications linkage between the first device and the second device may be a wired linkage. The communications linkage between the first device and the second device may be a near field magnetic inductance (NFMI) wireless linkage. The communications linkage between the first device and the second device may be an ultra-wideband (UWB) wireless linkage. The transceiver of the first device and the transceiver of the second device may share connection data related to connection with the remote device. The transceiver of the first device and the transceiver of the second device may have synchronized protocol stacks. The first device and the second device may each perform signal measurements of signals from the remote device and share the signal measurements there between. The first device and the second device may be configured to coordinate handover of a connection with the remote device. The remote device may be a mobile device configured for communicating streaming audio.

According to another aspect, a system includes a first wearable device having a radio transceiver and an antenna operatively connected to the radio transceiver and a second wearable device having a radio transceiver and an antenna operatively connected to the radio transceiver, the first device in operative communication with the first device through a communications linkage separate from the radio transceiver of the first device and the radio transceiver of the second device. The first wearable device may be adapted to wirelessly communicate with a remote device through the radio transceiver of the first wearable device. The second wearable device may be adapted to wirelessly communicate with the remote device through the radio transceiver of the second wearable device. The first wearable device and the second wearable device may be adapted to perform signal measurements relative to the remote device and share measurement information and perform handovers there between. The first wearable device may be a left ear piece and the second wearable device may be a right ear piece. The first wearable device may be a left portion of a headphone set and the second wearable device may be a right portion of the headphone set.

According to another aspect, a method for improving signal communications is provided. The method includes providing a first wearable device and a second wearable device, monitoring at least one signal parameter associated with a signal communicated between a remote device and a radio transceiver of the first wearable device, monitoring at least one signal parameter between the remote device and a radio transceiver of the second wearable device. The method further includes communicating data between the first wearable device and the second wearable device over a communication channel separate than a communications channel between the radio transceiver of the first wearable device and the radio transceiver of the second wearable device. The method further includes connecting one of the first wearable device and the second wearable device, the one receiving a better signal based on a comparison of the at least one signal parameter associated with the signal communication between the remote device and the radio transceiver of the first wearable device and the at least one signal parameter associated with the signal.

DETAILED DESCRIPTION

The present invention relates to wearable devices including ear pieces, wireless headphones and other devices, especially where there are multiple wearable devices capable of being in operative communication with a remote device, an external device, or source. Such a remote device may be a mobile device such as a phone or tablet, or other type of computing device. Although various types of devices, wearable devices or personal area devices are contemplated, for purposes of explanation, generally the example of a wireless headphone or a set of wireless earpieces is used. In the case of the headphone, the wireless connection is the connection between the headphone and the external wireless device. The connection between the two earpieces may be wireless or may be a wired connection. A wireless headphone necessitating the use of two radio units would suffice. The headphone or wireless earpiece set comprises two radio units, one per side. The source is bonded to only one of the two radios. The two radios can communicate with each other over a separate channel which is not affected by the same propagation issues. Some examples of this separate channel are the use of UWB, magnetic induction such as NFMI or wired connections. One of the radios behaves in the normal fashion, e.g. it advertises its presence and services to the surrounding environment. The other radio is a clone of the visible one, e.g. if they were visible, they would be indistinguishable from the one the source talks to.

According to one example, coverage of Bluetooth wireless headphones is extended using coordinated radios. The radios in the headphone or earpieces share all the connection data related to the connected source and their protocol stacks can be synchronized. All the radios perform signal measurements in relation to the source and share the measurements information over the out-of-band channel. The radios coordinate among themselves a seamless handover of the connection to the source to achieve the best signal, depending on their position on the body. The radio with the best signal becomes active and takes over the communication from the previously connected radio. A connection can be established and maintained even in more adverse environments. Even in less adverse environments, the advantage of a lower power connection may be utilized.

Figure 1:
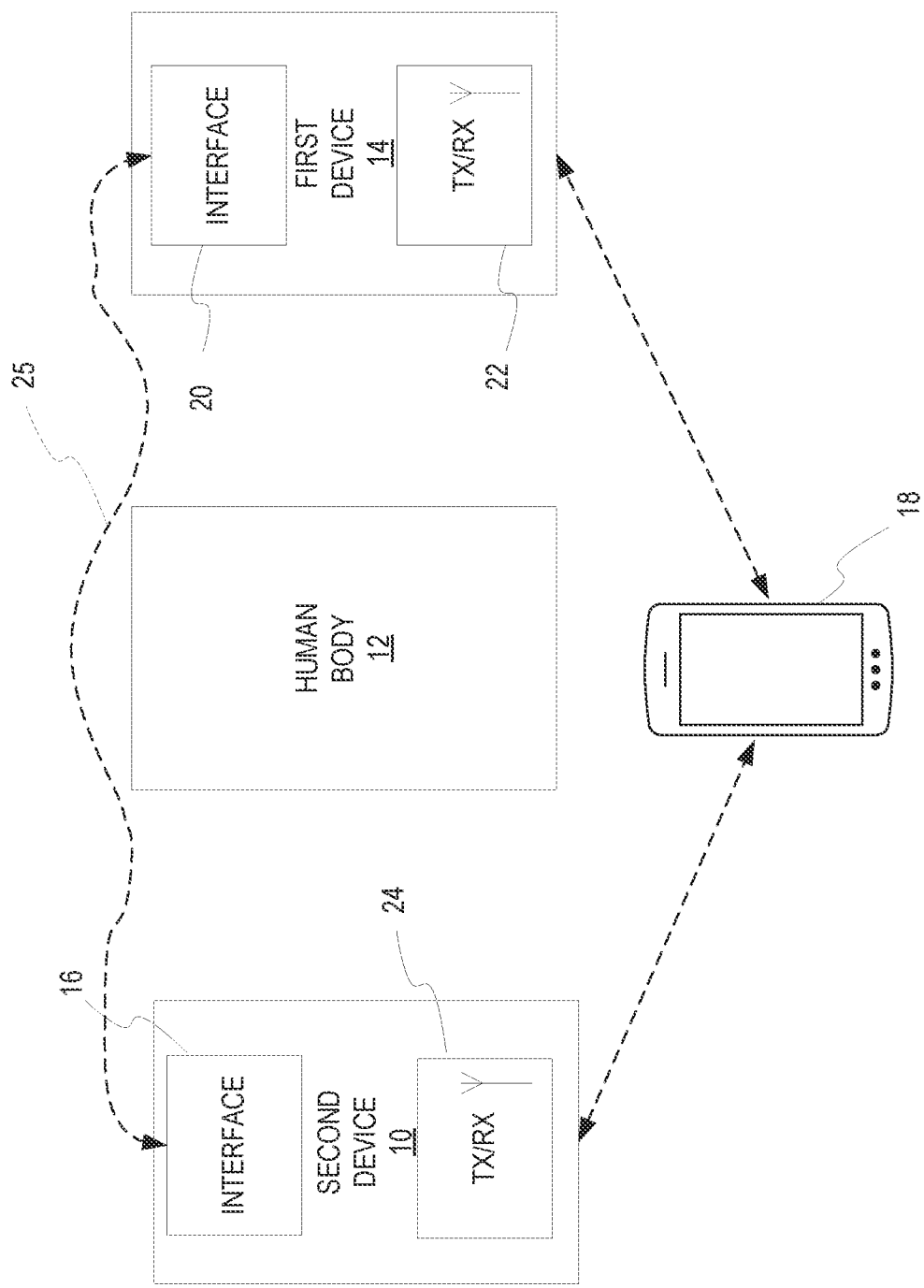
FIG. 1 illustrates one example of a system.

FIG. 1 illustrates one example of a system. As shown in FIG. 1 there is a first device 14 and a second device 10. The first device 14 and the second device 10 may be wearable devices such as ear pieces or portions of a headphone set, or other type of devices. A human body 12 may be situated between the first device 14 and the second device 10. A remote or external device or source 18 is also shown in contact with the first device 14 and the second device 10. Note the remote device 18 may be on one side of the human body 12 or the other side of the human body 12. Thus, for example, where the remote device 18 is a mobile phone, the mobile phone may, for example, be in the left pants pocket of a user or may be in the right pants pocket of the user. The location of the remote device 18 relative to the first device 14 or the second device 10 may adversely affect signal strength which may be problematic in various situations such as where the remote device 18 is sending streaming audio to the first device 14 and/or the second device 10. A transceiver such as a radio transceiver such as a Bluetooth transceiver 22 may be present in the first device 14 and another radio transceiver such as a Bluetooth transceiver 24 may be present in the second device 10. An antenna may be operatively connected to the transceiver 22 of the first device 14 and an antenna may be operatively connected to the transceiver 24 of the second device 10. In addition, the first device has an interface 20 and the second device has an interface 16 which put the first device 14 and the second device 10 in operative communication. The interfaces 16, 20 may be a wireless interface which provide for wireless communications such as through magnetic induction, near field magnetic induction (NFMI), ultra-wideband (UWB) or other types of wireless communications. Alternatively, the interfaces 16, 20 may connect with one another through a wired interface. Thus, the interfaces 16, 20 may provide for a wireless linkage or a wired linkage.

The first device 14 and the second device 10 may both connect to the device 18 and may both analyze the signal from the device 18 such as to determine the strength of the signal. The first device 14 and the second device 10 may then communicate information about the measured signal strength or other signal characteristics through their linkage between interfaces 16, 20 to determine which of the devices is better receiving the signal from the device 18. Thus, the first device 14 and the second device 10 determine which device has a better connection with the device 18 and then use the connection for communications. It is contemplated this may be accomplished in various ways and use one or more signal parameters such as, but not limited to signal strength, signal-to-noise ratio, received signal strength indicator (RSSI), noise, signal quality or other signal measurements or other parameters. In addition, both the first device 14 and the second device 10 may include an intelligent control (not shown) such as one or more processors or controllers which may be used to evaluate signals or may be involved in the switching. Alternatively, this functionality may be accomplished by the transceiver(s) 22, 24.

Both first device 14 and the second device 10 may perform signal measurements in relation to the source associated with the device 18 and share the measurement information over the out-of-band communications channel 25. In addition, radios of the first device and the second device coordinate among themselves such as to provide a seamless handover of the connection to the device 18 or source in order to achieve the best signal. Thus, the radio with the best signal becomes active and takes over communications.

Figure 2:
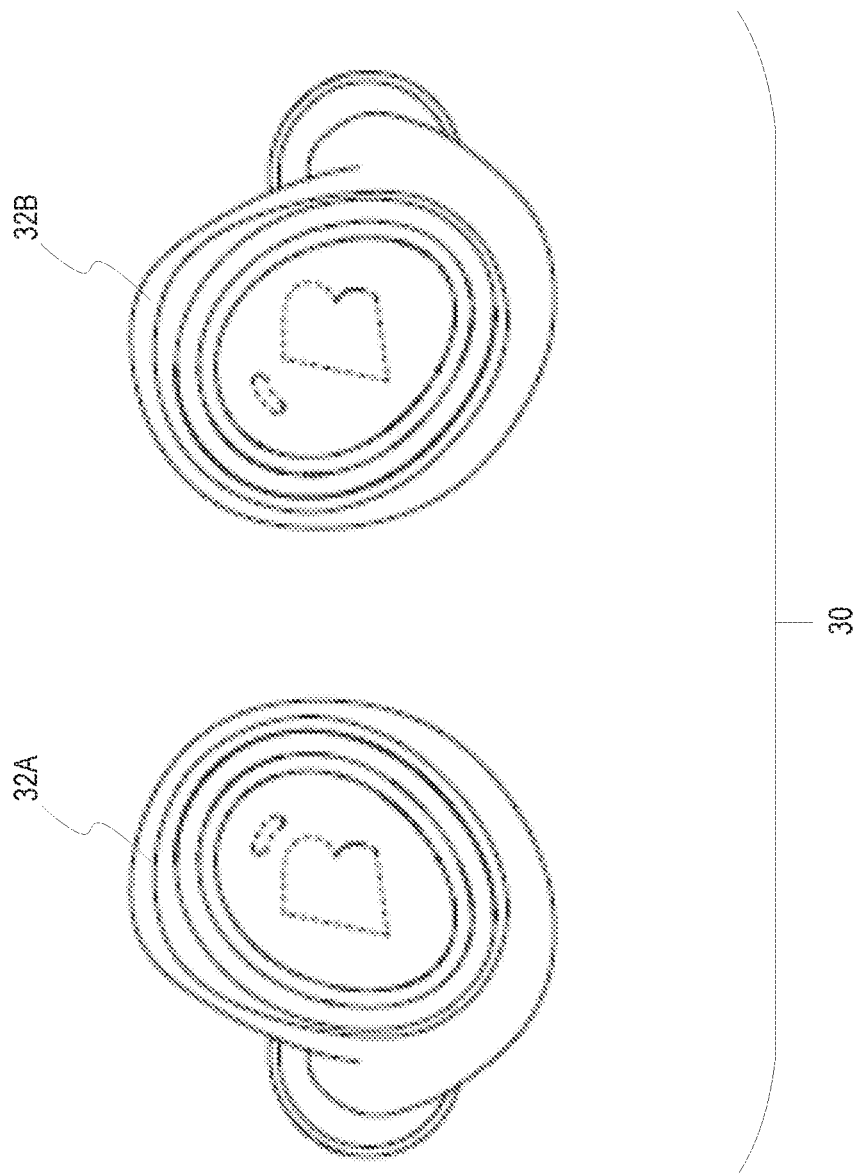
FIG. 2 illustrates one example of wearable devices in the form of left and right ear pieces.

FIG. 2 illustrates a set of ear pieces 30 which include a left device 32A and a right device 32B. In such an embodiment, a wireless linkage may be used to communicate between the left device and the right device. The wireless linkage used is separate from any wireless linkage between the left device or right device and the remote device.

Figure 3:
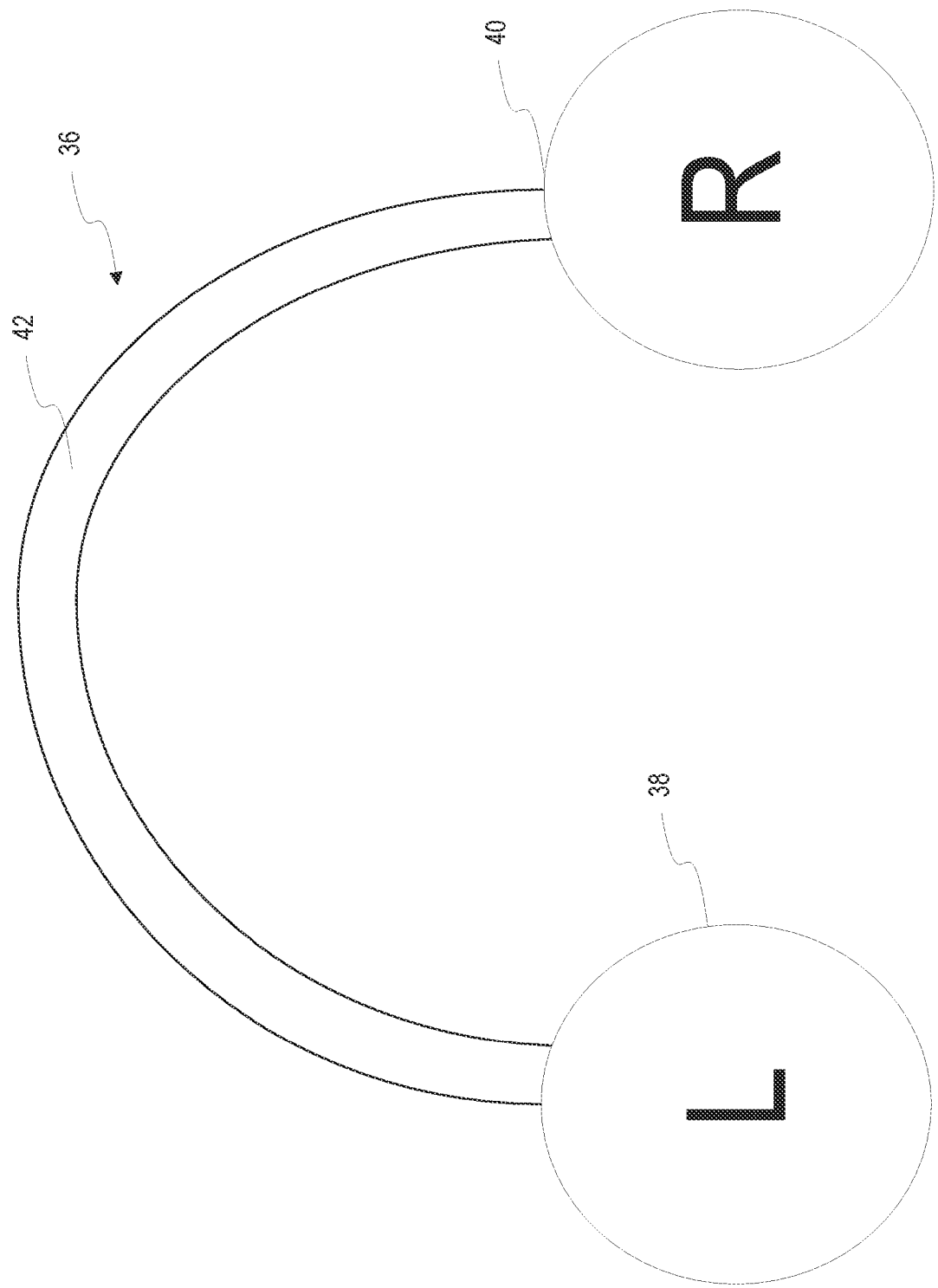
FIG. 3 illustrates one example of wearable devices in the form of headphones having left and right portions.

FIG. 3 illustrates a set of headphones 36 with a left device 36 and a right device 40 and a central portion 42 spanning between the left device 36 and the right device 40. In such an embodiment, a wired connection may be used between the left device and the right device, the wire (not shown) traversing the central portion 42.

Although various types of radio transceivers may be used according to various protocols and standards, various embodiments may be implemented consistent with the Bluetooth standard. It is observed a multiuser diversity system would theoretically solve at least some of the problems addressed, but such a system works outside of the Bluetooth standard. Further, it would also be limited since candidate receivers may not always be available. Thus, a universally stable solution is provided herein not requiring cooperation between transmitting device and the location of receiving devices. This is advantageous because Bluetooth cannot implement such a standard; and there are benefits to remaining within the Bluetooth standard to maintain the compatibility of Bluetooth devices support.

It should also be appreciated a connection can be established and maintained even in significantly adverse environments. This is especially important for problematic experiences of using an audio device streaming music while placed in a location unfavorable for stable streaming. One example is the use of an audio streaming device where the receiving unit is present in the right ear, and the audio streaming device is in the user's left pants pocket. In the cited example, the receiving unit would switch from the right side to the left.

It should be further appreciated one of the advantages of various embodiments relates to lower power utilization. Lower power utilization may be achieved, as the linkage is automatically established with the receiving unit in the optimal location for reception of the transmitted signal. One example would be facilitating the ability to link to a receiving unit which moves into a line of sight position.

In addition, advantages over typical antenna diversity solutions is achieved. Antenna diversity increases the level of difficulty of implementation of a proposed solution, while still suffering from the fact no matter how many antennas are hypothesized, physical location in the desired area will still be required. The use of a physical unit at the desired location solves the problem of weak transmission to the underserved area.

The invention is not to be limited to the embodiments described herein. The foregoing description has been presented for purposes of illustration and description. It is not intended to be an exhaustive list or limit any of the invention to the precise forms disclosed. It is contemplated other alternatives or exemplary aspects are considered included in the invention. The description is merely examples of embodiments, processes or methods of the invention. It is understood any other modifications, substitutions, and/or additions can be made, which are within the intended spirit and scope of the invention.

What is claimed is:

1. A method for improving signal communications, the method comprising:
    (a) providing a first wearable device and a second wearable device;
    (b) monitoring at least one signal parameter associated with a signal communicated between a remote device and a Bluetooth radio transceiver of the first wearable device;
    (c) monitoring at least one signal parameter between the remote device and a Bluetooth radio transceiver of the second wearable device;
    (d) communicating data between the first wearable device and the second wearable device over a separate communication channel, the separate communication channel separate from a communications channel between the Bluetooth radio transceiver of the first wearable device and the Bluetooth radio transceiver of the second wearable device;
    (e) performing a comparison at the first wearable device and/or the second wearable device the at least one signal parameter between the remote device and the Bluetooth radio transceiver of the first wearable device and the at least one signal parameter between the remote device and the Bluetooth radio transceiver of the second wearable device to select based on the comparison one of the first wearable device and the second wearable device to establish a Bluetooth linkage with the remote device;
    (f) establishing the Bluetooth linkage between the remote device and one of the first wearable device and the second wearable device based on the comparison;
    (g) repeating steps (b)-(e) until the comparison results in selection of a different one of the first wearable device and the second wearable device;
    (h) handing over the Bluetooth linkage with the remote device from one of the first wearable device and the second wearable device to the other of the first wearable device and the second wearable device.

2. The method of claim 1 wherein the remote device is a mobile phone.

3. The method of claim 2 wherein the first wearable device is a left portion of a headphone set and the second wearable device is a right portion of the headphone set.

4. The method of claim 1 wherein the first wearable device is a left ear piece.

5. The method of claim 4 wherein the second wearable device is a right ear piece.

6. The method of claim 1 wherein the at least one signal parameter includes at least a wireless radio connection strength.

7. The method of claim 1 wherein the separate communications channel is a wired linkage.

8. The method of claim 1 wherein the separate communications channel is a near field magnetic induction wireless linkage.

9. The method of claim 1 wherein the Bluetooth radio transceiver of the first wearable device and the Bluetooth radio transceiver of the second wearable device have synchronized protocol stacks.

10. A method for improving signal communications, the method comprising:
  (a) providing a first wireless earpiece and a second wireless earpiece;
  (b) monitoring at least one signal parameter associated with a signal communicated between a remote device and a Bluetooth radio transceiver of the first wireless earpiece;
  (c) monitoring at least one signal parameter between the remote device and a radio transceiver of the second wireless earpiece;
  (d) communicating data between the first wireless earpiece and the second wireless earpiece over a separate communication channel, the separate communication channel separate from a communications channel between the radio transceiver of the first wireless earpiece and the radio transceiver of the second wireless earpiece;
  (e) performing a comparison at the first wireless earpiece and/or the second wireless earpiece the at least one signal parameter between the remote device and the radio transceiver of the first wireless earpiece and the at least one signal parameter between the remote device and the radio transceiver of the second wireless earpiece to select based on the comparison one of the first wireless earpiece and the second wireless earpiece to establish a radio linkage with the remote device;
  (f) establishing the radio linkage between the remote device and one of the first wireless earpiece and the second wireless earpiece based on the comparison;
  (g) repeating steps (b)-(e) until the comparison results in selection of a different one of the first wireless earpiece and the second wireless earpiece;
  (h) handing over the radio linkage with the remote device from one of the first wireless earpiece and the second wireless earpiece to the other of the first wireless earpiece and the second wireless earpiece.

11. The method of claim 10 wherein the remote device is a mobile phone.

12. The method of claim 11 wherein the radio transceiver of the first wireless earpiece is a Bluetooth transceiver.

13. The method of claim 12 wherein the radio transceiver of the second wireless earpiece is a Bluetooth transceiver.

14. The method of claim 10 wherein the at least one signal parameter includes at least a wireless radio connection strength.

15. The method of claim 10 wherein the separate communications channel is a wired linkage.

16. The method of claim 10 wherein the separate communications channel is a near field magnetic induction wireless linkage.

17. The method of claim 10 wherein the radio transceiver of the first wireless earpiece and the radio transceiver of the second wireless earpiece have synchronized protocol stacks.

* * * * *